(12) United States Patent
Wu

(10) Patent No.: US 8,512,605 B2
(45) Date of Patent: Aug. 20, 2013

(54) METHOD FOR VERIFYING TOLERANCE OF CONNECTOR MOLDING DIE

(75) Inventor: Kun-Chan Wu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 508 days.

(21) Appl. No.: 12/944,744

(22) Filed: Nov. 12, 2010

(65) Prior Publication Data
US 2011/0272839 A1 Nov. 10, 2011

(30) Foreign Application Priority Data
May 5, 2010 (TW) .............................. 99114316 A

(51) Int. Cl.
*G02B 6/42* (2006.01)

(52) U.S. Cl.
USPC ..................... 264/1.26; 264/40.5; 264/40.1

(58) Field of Classification Search
USPC ................. 264/1.26, 40.1, 40.5; 385/53–92
See application file for complete search history.

(56) References Cited

U.S. PATENT DOCUMENTS

| | | | |
|---|---|---|---|
| 6,287,017 B1 * | 9/2001 | Katsura et al. | 385/59 |
| 6,340,247 B1 * | 1/2002 | Sakurai et al. | 385/78 |
| 2005/0041241 A1 * | 2/2005 | Pahk et al. | 356/237.1 |
| 2007/0217741 A1 * | 9/2007 | Shigenaga et al. | 385/33 |

* cited by examiner

*Primary Examiner* — Yogendra Gupta
*Assistant Examiner* — Ninh Le
(74) *Attorney, Agent, or Firm* — Altis Law Group, Inc.

(57) ABSTRACT

A method for verifying tolerance of a connector molding die includes, firstly, providing a first connector molding die, and molding a first optical connector using the first connector molding die. The centers of the lenses relative to the center of the first transmission surface are located. A second connector molding die is provided. A second optical connector is molded by the second connector molding die. The central locations of the first blind holes are determined by measuring the central locations of the second blind holes based on the center of the second transmission surface. Difference values between the locations of the centers of the lenses and the central locations of the first blind holes are determined.

8 Claims, 7 Drawing Sheets ically, the difference values $(X_0, Y_0)$ meet the following formulas: $X_0=|X-x|, Y_0=|Y-y|$.

METHOD FOR VERIFYING TOLERANCE OF CONNECTOR MOLDING DIE

BACKGROUND

1. Technical Field

The present disclosure relates to molding technologies and, particularly, to a method for verifying tolerance of a connector molding die.

2. Description of Related Art

Optical connectors are preferred for use in data transmission between electronic devices due to their high transmission speed and signal integrity. Generally, an optical connector defines a number of blind holes for precisely receiving optical fibers, and further includes lenses aligned with the optical fibers. In manufacturing, a connector molding die molds the optical connector. The connector molding die includes a lens insertion for forming the lenses, and a number of blind hole insertions for forming the blind holes.

However, when the optical connector is molded by the connector molding die, if the blind hole insertions are not aligned with cavities of the lens insertion, the optical fibers cannot be aligned with the lenses. As a result, the transmission accuracy and efficiency of the optical connector is reduced.

Therefore, what is needed is to provide a method for connector molding which can overcome the described limitations.

DETAILED DESCRIPTION

Figure 1:
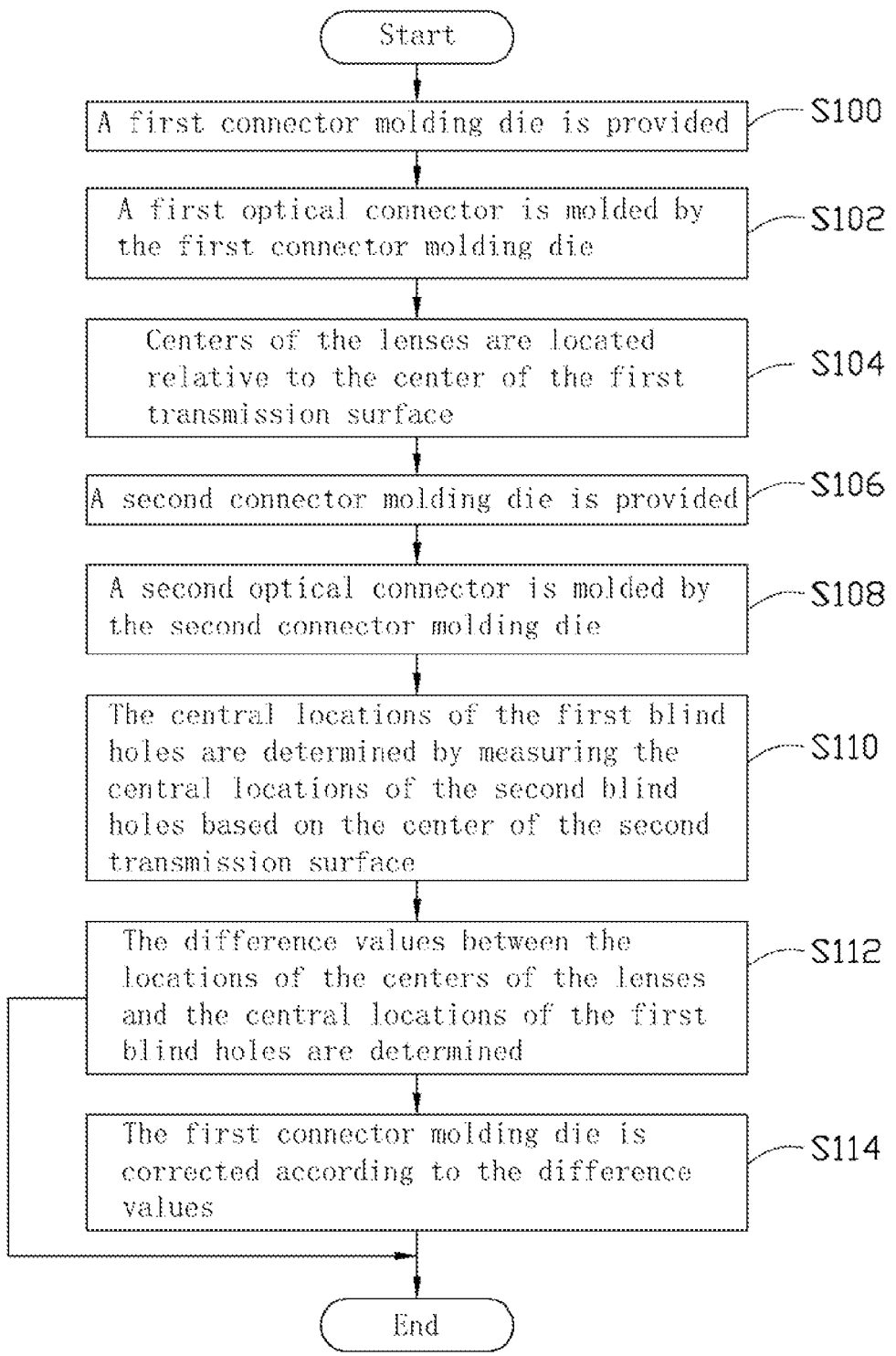
FIG. 1 is a flowchart of a method for verifying tolerance of a connector molding die, according to an exemplary embodiment.

Referring to FIG. 1, a method for verifying tolerance of a connector molding die, according to an exemplary embodiment, includes the following steps.

Figure 4:
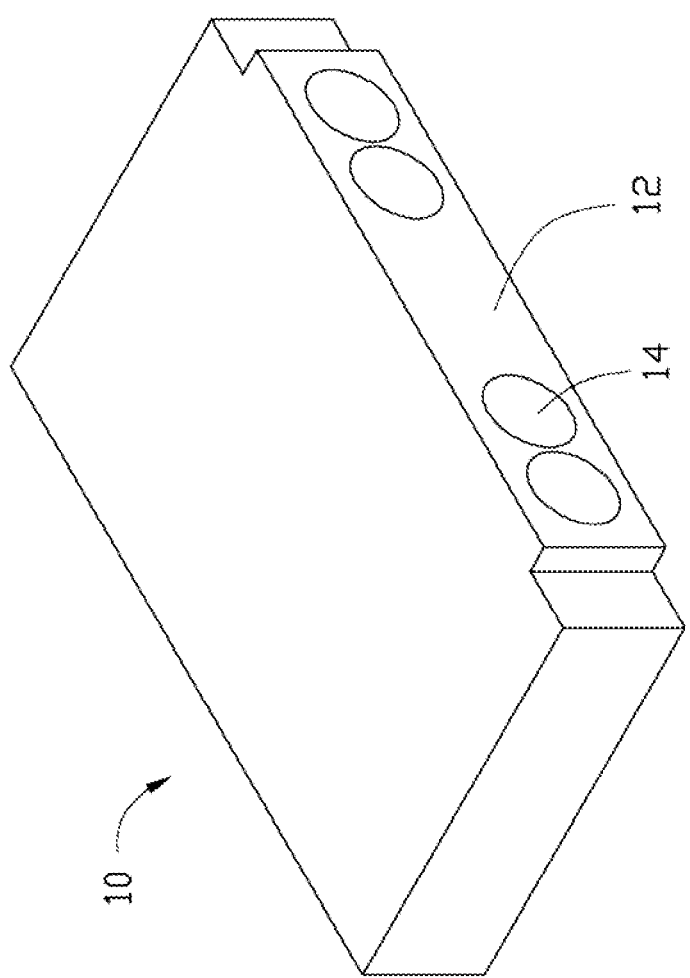
FIG. 4 is a schematic, isometric view of a lens insertion for forming the first optical connector of FIG. 2.

In step S100, a first connector molding die (not shown) is provided. Referring to FIG. 4, the first connector molding die includes a lens insertion 10 and four blind hole insertions (not shown). The lens insertion 10 includes a surface 12, and defines four cavities 14 at the surface 12. The lens insertion 10 is inserted into a body (not shown) of the first connector molding die and forms lenses 26 of a first optical connector 20 (shown in FIG. 2), the lenses 26 corresponding to the cavities 14. The four blind hole insertions are inserted into the body of the first connector molding die and form four first blind holes 24 of the first optical connector 20.

Figure 2:
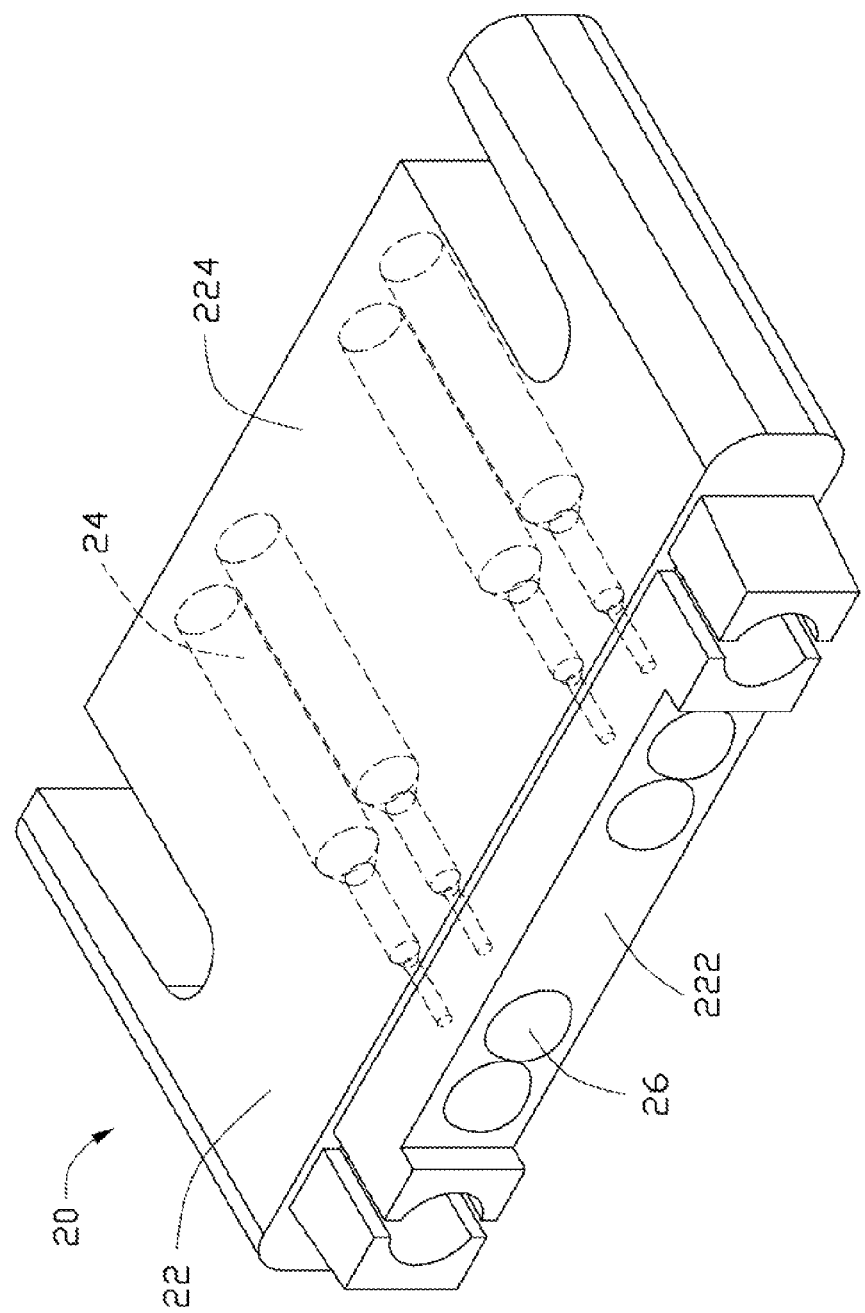
FIG. 2 is a schematic, isometric view of a first optical connector including lenses, the first optical connector made according to the method of FIG. 1.

In step S102, the first optical connector 20 (shown in FIG. 2) is molded by the first connector molding die. Referring to FIG. 2 together with FIG. 4, the first optical connector 20 includes a first transparent body 22, the four first blind holes 24, and the four lenses 26. The first transparent body 22 includes a first transmission surface 222, and a top surface 224 perpendicular to the first transmission surface 222. The lenses 26 are positioned on the first transmission surface 222. The first blind holes 24 are defined in the first transparent body 22, corresponding to the lenses 26.

Figure 3:
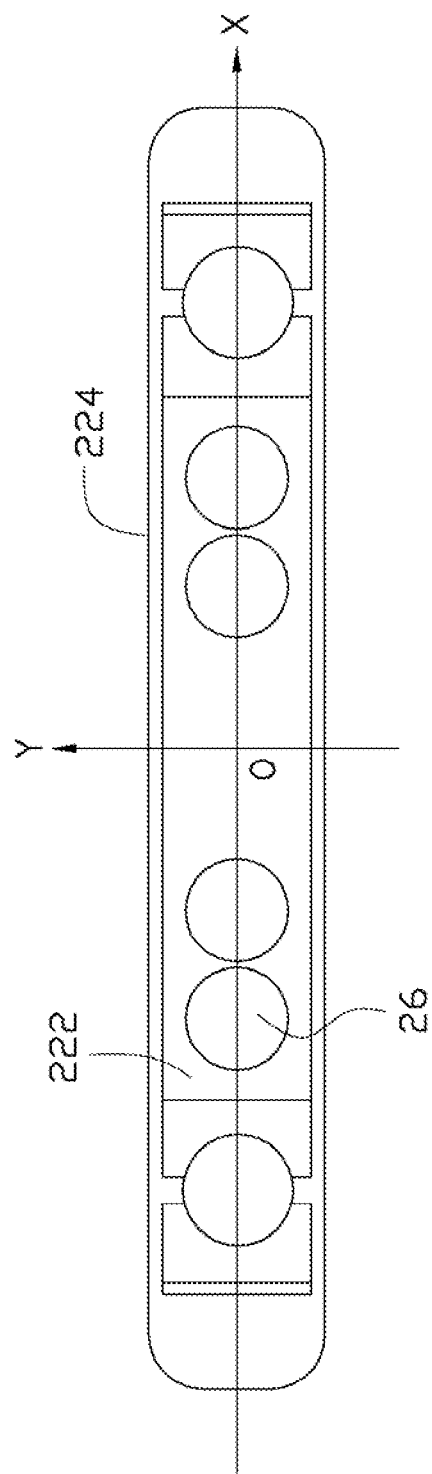
FIG. 3 is a front planar view of the first optical connector of FIG. 2, showing the locations of centers of the lenses.

In step S104, centers of the lenses 26 are located relative to the center of the first transmission surface 222. Referring to FIG. 3, a first Cartesian coordinate system is provided. The center of the first transmission surface 222 is defined as an origin 0 of the coordinate system. An X coordinate axis is on the first transmission surface 222. A Y coordinate axis is on the first transmission surface 222, and is perpendicular to the X coordinate axis and the top surface 224. In detail, the locations of the centers of the lenses 26 relative to the center of the first transmission surface 222 are coordinates of the centers of the lenses 26 in the first Cartesian coordinate system. The coordinates (X, Y) of the centers of the lenses 26 are measured by a measurement device, such as a ruler.

Figure 7:
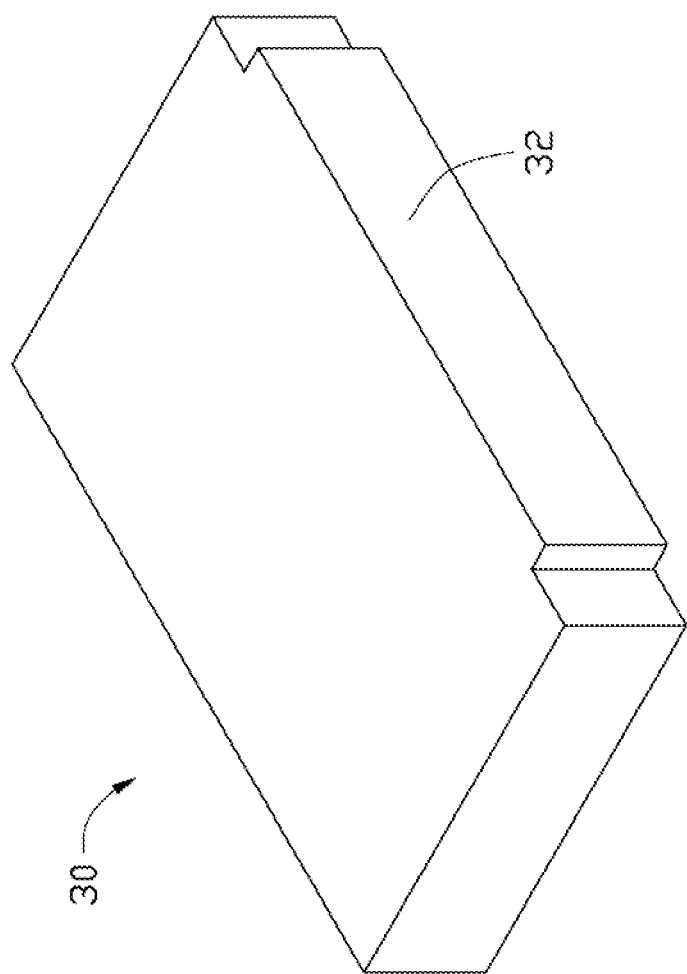
FIG. 7 is a schematic, isometric view of a plane insertion for forming the second optical connector of FIG. 5.

In step S106, a second connector molding die (not shown) is provided. First, a plane insertion 30 (shown in FIG. 7) is provided. Referring to FIG. 4 together with FIG. 7, the structure of the plane insertion 30 is similar to that of the lens insertion 10. The difference between the plane insertion 30 and the lens insertion 10 is that the plane insertion 30 includes a plane surface 32 without any cavities or grooves. Second, the lens insertion 10 is replaced by the plane insertion 30 in the first connector molding die to form the second connector molding die. Accordingly, the central locations and the common structure of the blind hole insertions of the second connector molding die are the same as those of the first connector molding die. In this description, unless the context indicates otherwise, "central locations" of "blind hole insertions" refers to locations of central axes of the blind hole insertions.

Figure 5:
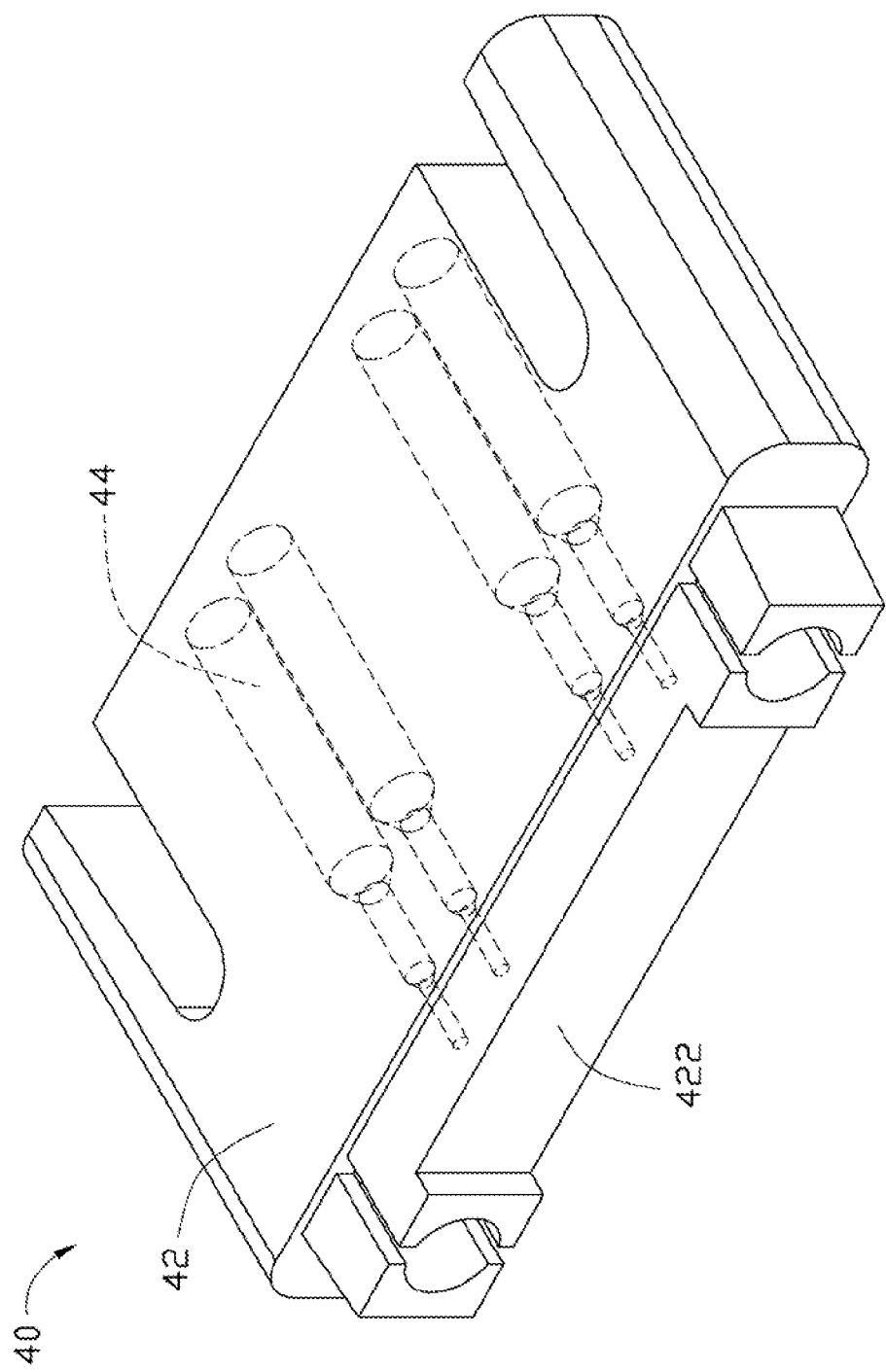
FIG. 5 is a schematic, isometric view of a second optical connector including second blind holes, the second optical connector made according to the method of FIG. 1.

In step S108, a second optical connector 40 (shown in FIG. 5) is molded using the second connector molding die. The second optical connector 40 includes a second transparent body 42, and defines four second blind holes 44 in the second transparent body 42. The second transparent body 42 includes a second transmission surface 422. The second connector 40 does not include any lenses. A location of the center of the second transmission surface 422 is the same as that of the center of the first transmission surface 222 in the first coordinate system. Accordingly, central locations of the second blind holes 44 are the same as those of the first blind holes 24, such central locations defined with reference to the center of the second transmission surface 422 and the center of the first transmission surface 222, respectively. In this description, unless the context indicates otherwise, "central locations" of "blind holes" refers to locations of central axes of the blind holes.

Figure 6:
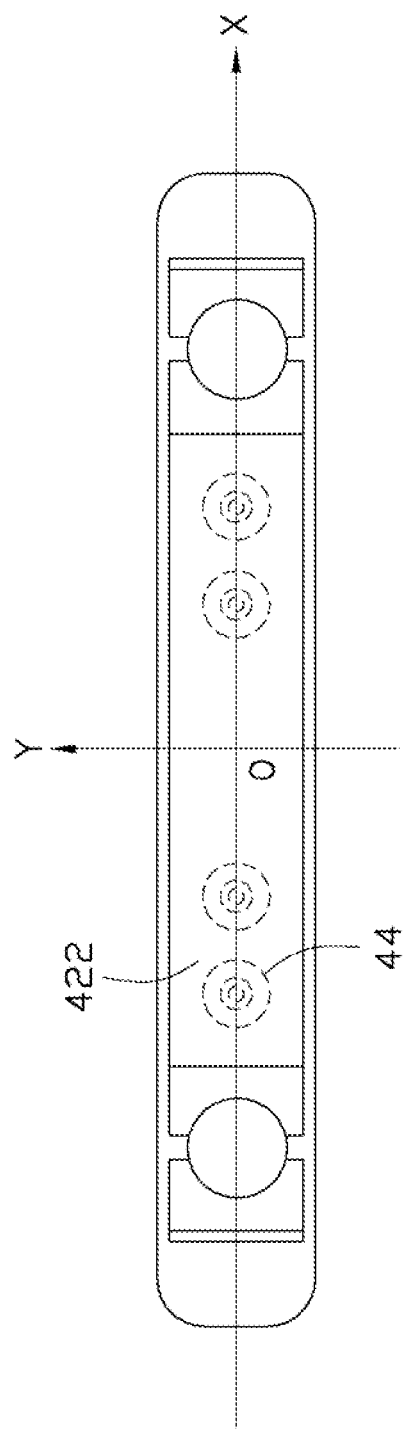
FIG. 6 is a front planar view of the second optical connector of FIG. 5, showing central locations of the second blind holes.

In step S110, the central locations of the first blind holes 24 are determined by measuring the central locations of the second blind holes 44 based on the center of the second transmission surface 422. Referring to FIG. 6, a second Cartesian coordinate system is provided. The second Cartesian coordinate system is the same as the first Cartesian coordinate system. The central locations (x, y) of the second blind holes 44 in the second Cartesian coordinate system are measured by a measurement device. As a result, the central locations (x, y) of the first blind holes 24 are also determined.

In step S112, the difference values between the locations (X, Y) of the centers of the lenses 26 and the central locations (x, y) of the first blind holes 24 are determined. In detail, the differences values $(X_0, Y_0)$ meet the following formulas: $X_0=|X-x|, Y_0=|Y-y|$.

In step S114, if the difference values are considered to be unsatisfactory, the first connector molding die is corrected according to the difference values. In particular, three methods may be applied in this step. The first method is: the locations of the centers of the cavities 14 on the surface 12 are adjusted to reduce the difference values $(X_0, Y_0)$ and make the difference values $(X_0, Y_0)$ fall within a predetermined range. The second method is: the central locations of the blind hole insertions in the first connector molding die are adjusted to reduce the difference values $(X_0, Y_0)$ and make the difference values $(X_0, Y_0)$ fall within a predetermined range. The third method is: the locations of the centers of the cavities 14 on the surface 12 and the central locations of the blind hole insertions in the first connector molding die are both adjusted to reduce the difference values $(X_0, Y_0)$ and make the difference values $(X_0, Y_0)$ fall within a predetermined range. If and when the difference values are considered to be satisfactory, step S114 is completed.

Then, after another first optical connector 20 is molded by the first connector molding die, the lenses 26 of such first optical connector 20 are exactly or at least approximately aligned with the first blind holes 24. Therefore, optical fibers subsequently installed in the first blind holes 24 are exactly or at least approximately aligned with the lenses 26. As a result, the transmission accuracy and efficiency of the first optical connector 20 are improved. Thus, the second optical connector 40 is just a "dummy" optical connector, and is only made once for the purposes of carrying out the method.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for verifying tolerance of a connector molding die, the method comprising:
    providing a first connector molding die;
    molding a first optical connector using the first connector molding die, the first optical connector comprising a first transparent body having a first transmission surface, a plurality of first blind holes defined in the first transparent body, and a plurality of lenses positioned on the first transmission surface corresponding to the first blind holes;
    locating centers of the lenses relative to a center of the first transmission surface;
    providing a second connector molding die;
    molding a second optical connector using the second connector molding die, the second optical connector comprising a second transparent body having a second transmission surface and a plurality of second blind holes defined in the second transparent body, the second optical connector not comprising lenses, the center of the first transmission surface being the same as that of the second transmission surface, and accordingly central locations of the first blind holes being the same as those of the second blind holes relative to the center of the first and second transmission surfaces respectively;
    determining the central locations of the first blind holes by measuring the central locations of the second blind holes based on the center of the second transmission surface; and
    determining difference values between the locations of the centers of the lenses and the central locations of the corresponding first blind holes.

2. The method of claim 1, wherein the first connector molding die comprises a lens insertion including a surface, the surface defines a plurality of cavities, and providing the second connector molding die comprises:
    providing a plane insertion including a plane surface, the plane surface not comprising a cavity, the center of the plane surface being the same as that of the surface of the lens insertion; and
    replacing the lens insertion with the plane insertion in the first connector molding die to form the second connector molding die.

3. The method of claim 2, wherein the locations of the centers of the lenses are coordinates of the centers of the lenses in a first Cartesian coordinate system, an origin of the first Cartesian coordinate system is defined at the center of the first transmission surface an X-coordinate axis and a Y-coordinate axis are on the first transmission surface, the Y coordinate axis is perpendicular to the X-coordinate axis, and the central locations of the first blind holes are the coordinates of centers of the first blind holes in the first Cartesian coordinate system.

4. The method of claim 3, wherein the central locations of the second blind holes are coordinates of centers of the second blind holes in a second Cartesian coordinate system, and the second Cartesian coordinate system is defined at the center of the second transmission surface and is the same as the first Cartesian coordinate system.

5. The method of claim 1, further comprising correcting the first connector molding die according to the difference values.

6. The method of claim 5, wherein correcting the first connector molding die according to the difference values comprises adjusting locations of centers of a plurality of cavities on a surface of a lens insertion to reduce the difference values and make the difference values fall within a predetermined range.

7. The method of claim 5, wherein correcting the first connector molding die according to the difference values comprises adjusting locations of blind hole insertions in the first connector molding die to reduce the difference values and make the difference values fall within a predetermined range.

8. The method of claim 5, wherein correcting the first connector molding die according to the difference values comprises adjusting locations of centers of a plurality of cavities on a surface of a lens insertion and locations of blind hole insertions in the first connector molding die to reduce the difference values and make the difference values fall within a predetermined range.

* * * * *